G. CLAUSING.
LAST TURNING LATHE.
APPLICATION FILED MAR. 15, 1912.
1,052,217.
Patented Feb. 4, 1913.
2 SHEETS—SHEET 1.
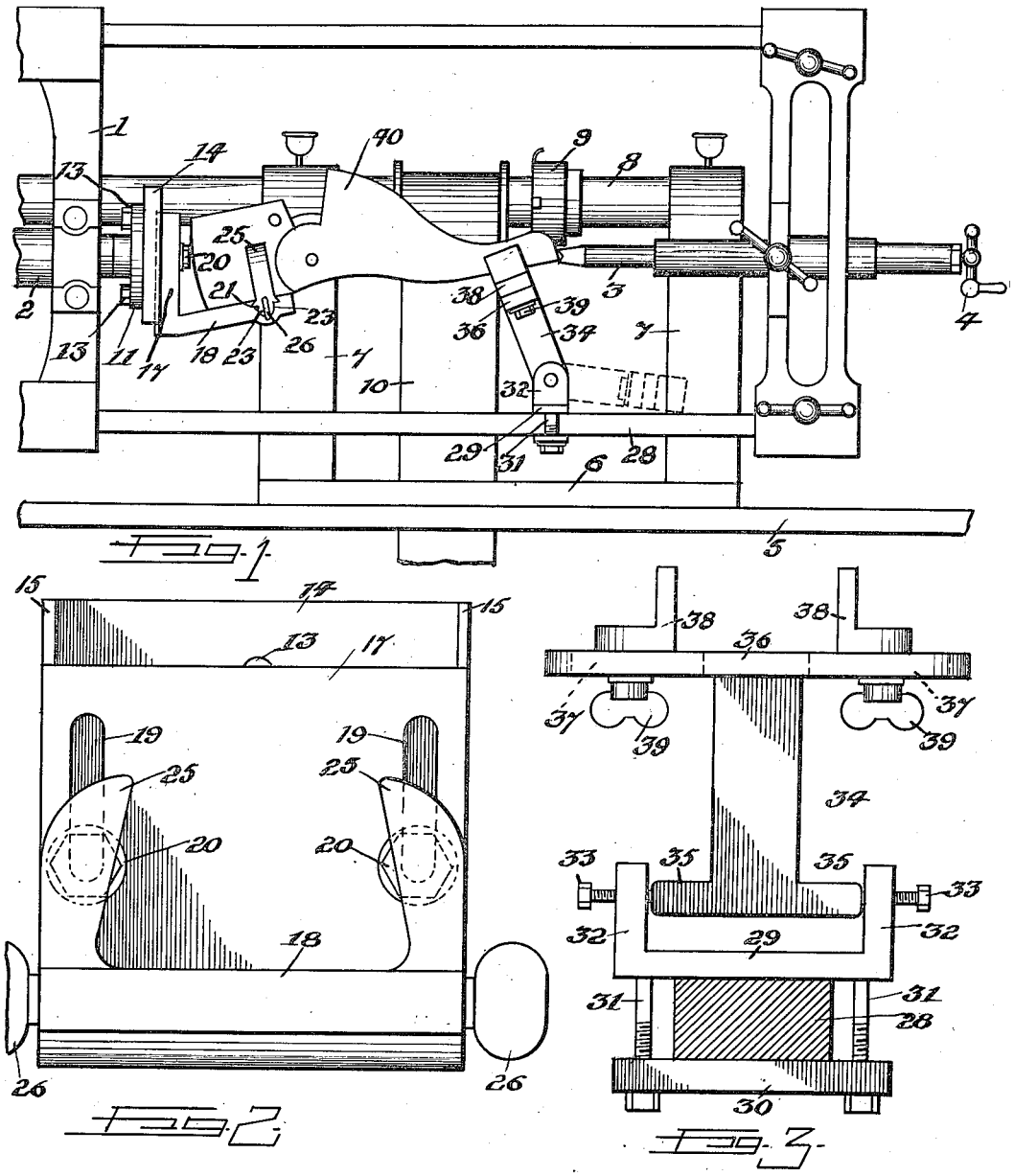

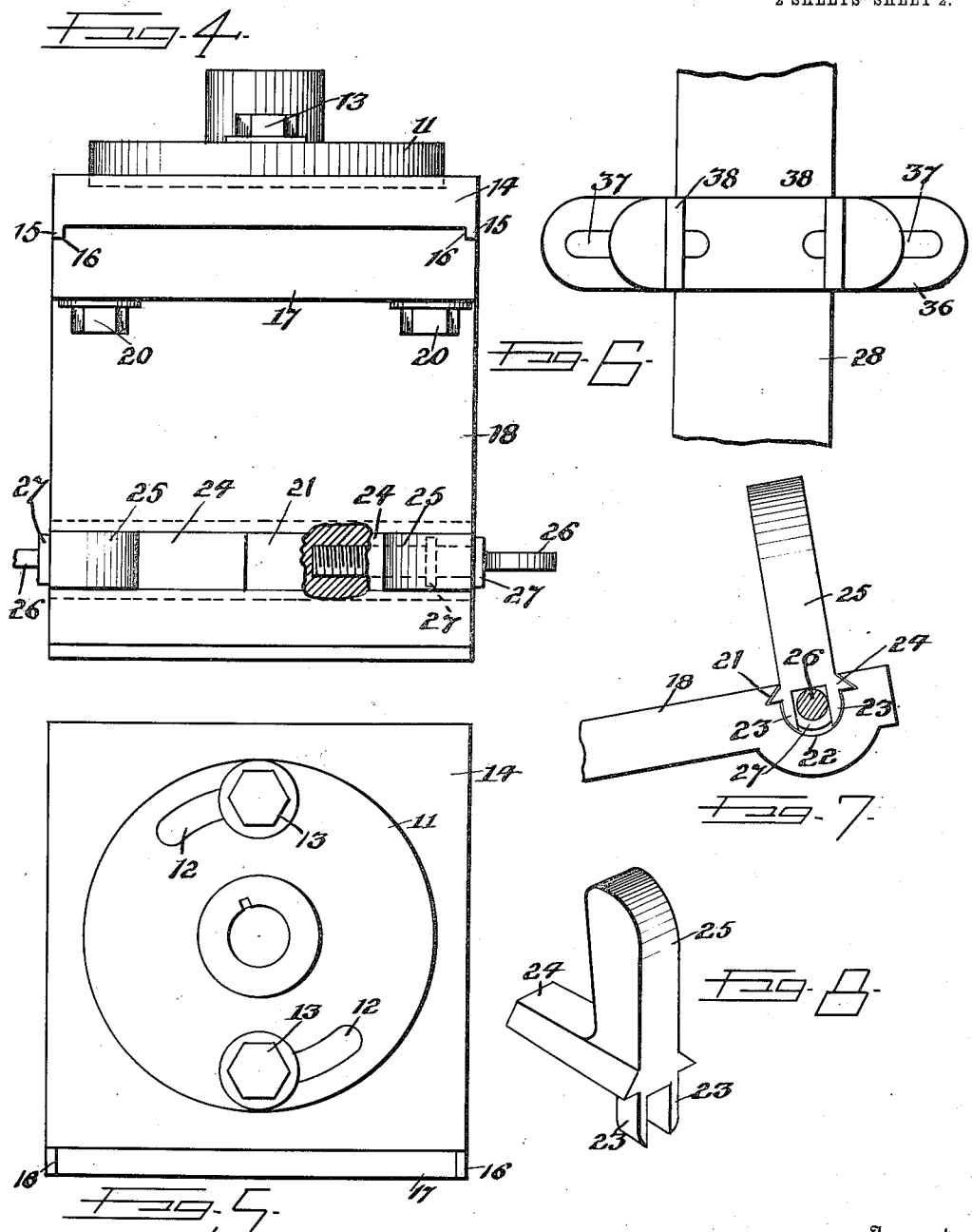

UNITED STATES PATENT OFFICE.

GEORGE CLAUSING, OF PORTSMOUTH, OHIO, ASSIGNOR TO THE VULCAN BOX TOE PROCESS CO., OF PORTSMOUTH, OHIO, A CORPORATION OF OHIO.

LAST-TURNING LATHE.

1,052,217.      Specification of Letters Patent.      Patented Feb. 4, 1913.

Application filed March 15, 1912. Serial No. 684,015.

*To all whom it may concern:*

Be it known that I, GEORGE CLAUSING, a citizen of the United States, residing at Portsmouth, in the county of Scioto and State of Ohio, have invented certain new and useful Improvements in Last-Turning Lathes, of which the following is a specification, reference being had therein to the accompanying drawing.

This invention has relation to last turning lathes and has for its object the provision of novel means for fixing in proper position in the lathe and securely holding during the turning operation, previously finished lasts which are to be remodeled or reshaped.

The usual manner of reshaping or remodeling lasts is to file and sandpaper them offhand, the eye of the operator being the only guide to accuracy, and hence this operation requires extraordinary skill, the work is slow, laborious and expensive and absolute uniformity of product is impossible.

The purely manual operation above referred to can be obviated and better and uniform results accomplished, by placing the previously finished lasts in an ordinary last turning lathe and the remodeling or reshaping them by means of the ordinary and well known appurtenances of such lathes. The chucks and centers of an ordinary last turning lathe are, however, not adapted to the proper positioning and holding of a previously finished last, which is to be remodeled or reshaped, and my present invention consists in the novel construction, combination and arrangement of parts hereinafter described for properly positioning and securely holding a last in a last turning lathe so that absolute accuracy and uniformity of the finished products may be attained.

Referring to the accompanying drawing: Figure 1 is a side elevation of a portion of a last turning lathe of ordinary construction having my improved chuck and toe gage applied thereto. Fig. 2 is a front elevation of the chuck. Fig. 3 is a front elevation of the toe gage. Fig. 4 is a plan view of the chuck. Fig. 5 is a rear elevation of the chuck. Fig. 6 is a plan view of the toe gage. Fig. 7 is a side elevation partly in section, of a part of the chuck. Fig. 8 is a perspective view of one of the jaws of the chuck.

Fig. 1 of the drawing is, it will be observed, on a reduced scale and illustrates only so much of a last lathe as is necessary to a clear understanding of my present improvements and in this figure, 1 designates the swinging frame in which is journaled the rotary spindle 2, that carries the last holding chuck and in which frame is mounted the longitudinally adjustable swiveled tail stock spindle 3, which is longitudinally adjusted by a handle 4.

The stationary ways of the lathe are designated 5, and on these are carried the longitudinally slidable plate 6, upon which are rigidly mounted the housings 7, in which is journaled the rotary cutter shaft 8, carrying the rotary cutter 9, and actuated by the belt 10.

The parts above designated are all of the old and well known construction and need not, therefore, be particularly described, it being well understood by those skilled in the art, that very rapid rotary motion is communicated to the cutter shaft 8, and cutter 9, by the belt 10, and that a longitudinal movement is imparted to the plate 6, so that the cutter will move from end to end of the block supported between the chuck and the tail stock and that, meanwhile, a comparatively slow rotary movement is imparted to the spindle 2, and the frame 1, is slowly swung back and forth toward and from the cutter in accordance with motion imparted to it from a pattern last carried by the rocking frame and a guide wheel mounted on cutter shaft 8, all in the usual manner.

My improved chuck is mounted on the spindle 2 and is designed to hold a last which has been previously finished, but which is to be remodeled or reshaped.

The spindle 2, has a diminished end to receive the chuck ordinarily employed in lathes of this character and on this end of spindle 2, I arrange a face plate 11, of circular form, this face plate being provided with curved slots 12 concentric with the edge of the face plate and adapted to receive screws 13, by means of which a square chuck plate 14, is securely attached to the face plate. The rear surface of the chuck plate 14 is countersunk to receive the face plate 11, so as to permit of a limited circular adjustment of the chuck plate on the face plate by loosening the screws 13.

The chuck plate 14, is formed with ribs 15, on its vertical edges and the ribs 15, fit in grooves 16, in the edges of the vertical portion 17, of the chuck body. The chuck body is a solid substantially "L" shaped piece of metal comprising the vertical portion 17, and the nearly horizontal, but slightly upwardly angled, section 18, these two portions 17, and 18, being preferably made integral. The portion 17, is formed with vertical slots 19, through which are passed screws 20, that screw into the chuck plate 14, these slots and screws permitting adjustment of the chuck body on the chuck plate.

The portion 18, of the chuck body is formed with a dovetail slot 21, in its upper face and extending from side to side, and at each end of this slot a cavity 22, is formed to receive depending lugs 23, carried by sliding blocks 24, fitted to the dovetailed slot 21, and having each an upwardly extending, inwardly curved jaw 25. The lugs 23, of the blocks 24, straddle screws 26, that screw into screw-threaded holes formed in the body of the portion 18, at the inner ends of the cavities 22, these screws 26, being formed with collars 27, that bear against the inner and outer edges of the depending lugs 23, so as to cause blocks 24, and jaws 25, to travel with the screws 26, as the latter are screwed in or out.

The toe gage is illustrated in Figs. 1, 3, and 6, and is intended and adapted to coact with the chuck in accurately positioning the lasts, so that each last of a series or lot of the same which are to be remodeled or reshaped to the same size and contour, may be finished with absolute accuracy and uniformity. The toe gage is adjustably mounted on the lower bar 23, of the swinging frame 1, and is composed of a base portion adapted to be adjustably attached to the bar 23, and a movable upper portion that is adapted to be swung up into position to receive the toe of the last when the latter is being fixed in position and then swung downwardly out of the way of the last and the cutter, after the positioning of the last has been accomplished and before the cutting operation is started.

The base portion of the toe gage comprises a flat plate 29, that rests on the bar 28, and is held tightly thereon at any position to which it may be adjusted by a cross bar 30, through which pass screws 31, that screw into the plate 29. The plate 29, has a standard 32, at each end and in these standards are arranged pivot screws 33, that serve to pivotally support the upper swinging section of the toe gage.

The swinging section comprises the central standard 34, the lateral arms 35, and the upper bearing plate 36, the latter being of considerably greater length than the plate 29, and being formed with longitudinally disposed slots 37, through which pass thumb screws 39, that screw into and hold in adjusted position the adjustable gage block 38.

Operation: A last 40, is shown in position in the lathe in Fig. 1, of the drawing and it will be observed that the heel portion of the last rests upon the upwardly inclined portion 18, of the chuck body. The screws 13, are loosened to permit of bringing the last 40, into a position coinciding with the position of the pattern last by the circular adjustment of the plate 14, and when this positioning has been accomplished the screws 13 are tightened up. The screws 20, being also loosened the chuck body is moved up or down, as may be required, to bring the heel of the last 40 into horizontal alinement with the pattern last; meanwhile the toe gage has been swung up into vertical position so as to support the toe of the last, and alinement of the toe of the last 40, with the toe of the pattern is secured by adjustment of the gage blocks 38. When the proper position of the toe of last 40, has been determined the gage blocks are secured in fixed position by tightening up screws 39, and thereafter so long as a particular set or series of lasts are being operated on, the gage jaws are allowed to remain in fixed position on plate 36. After the position of the toe has been determined and fixed the adjustment of the heel of last 40, on a horizontal plane, that is to one side or another of the portion 18, of the chuck body, is accomplished by manipulating the jaws 25, through the medium of the screws 26, and, when the proper adjustment has been secured, the jaws are screwed up tight on the last 40, and serve to hold the same tightly during the turning operation. After the last 40 has been adjusted and fixed in position as described, the tail stock spindle 3 is screwed up against the toe of the last and the toe gage is then swung down into the position shown in dotted lines in Fig. 1, and the lathe started up and operated in the usual manner which will result in turning down the last 40, to exactly correspond in size and shape to the pattern last. After the last has been turned down it is removed from the lathe by loosening one of the jaws 25, and the tail stock spindle 3, the other jaw 25, being left stationary so that it will serve to exactly position the last which is next placed in position. After the first adjustment of parts, as above described, has been secured no further adjustment is necessary so long as a series of lasts are to be remodeled to the same size and shape as the one first operated on.

The placing of another last in the lathe after the first one of a series has been finished is exceedingly simple, it being only necessary to swing the toe gage up into position, shown in full lines in Fig. 1, place the last with its heel resting on portion 18, of the chuck body, then tighten up the jaw 25, and the tail stock spindle 3, and then swing down the toe gage to the position shown in dotted lines in Fig. 1, whereupon the cutting operation is proceeded with as before described.

I claim:

1. The combination in a last turning lathe of a chuck carried by the lathe spindle and having holding jaws and provided with means for lateral adjustment relatively to the spindle, in a plane at right angles to the spindle, a toe gage adapted to successively locate in the same position the toes of a series of lasts, while the latter are sustained by the chuck, and a tail stock spindle adapted to sustain the toes of the lasts after they have been located by the gage.

2. The combination in a last turning lathe of a chuck adapted to hold the heel of a last, with a tail stock spindle and a toe gage adjustable to determine the position of the toe of the last and movable into and out of operative relation to the last without disturbing said adjustment.

3. The combination in a last turning lathe of a circularly and laterally adjustable chuck adapted to hold the heel of a last and a toe gage adapted to position the toe of the last.

4. The combination in a last turning lathe of a laterally adjustable chuck adapted to hold the heel portion of a last and a movable toe gage having adjustable gage blocks, said toe gage being adapted to sustain the toe portion of a last in proper position relative to the tail stock of the lathe, while the heel portion is being secured in the chuck.

5. The combination in a last turning lathe, of a chuck adapted to hold the heel of a last and a tail stock spindle adapted to hold the toe of a last during the turning operation, with a toe gage adapted to locate the toe of the last in proper position for the engagement of the tail stock spindle, said toe gage comprising a base portion, a pivoted upper portion adapted to swing in a plane coinciding with the axis of the tail stock spindle and adjustable gage blocks carried by the said pivoted portion.

6. The combination in a last turning lathe of a chuck, a rotary tail stock spindle and a toe gage, the latter having a base portion adjustably mounted on the lathe and having a pivoted upper portion carrying gage blocks.

7. The combination with the organized mechanism of a last turning lathe, of a toe gage adjustably mounted on the lathe and having a pivoted upper portion and adjustable gage blocks carried by said pivoted upper portion.

In testimony whereof I affix my signature in presence of two witnesses.

GEORGE CLAUSING.

Witnesses:
W. J. BURKE,
JOHN R. HUGHES.